United States Patent [19]
Yashima et al.

[11] Patent Number: 5,479,394
[45] Date of Patent: Dec. 26, 1995

[54] OPTICAL RECORDING MEDIUM, RECORDING SYSTEM AND REPRODUCING SYSTEM

[75] Inventors: Masataka Yashima, Yokohama; Hiroyuki Sugata, Yamato; Tsuyoshi Santoh; Miki Tamura, both of Yokohama; Chieko Mihara, Isehara, all of Japan

[73] Assignee: Canon Kabushiki Kaisha, Tokyo, Japan

[21] Appl. No.: 883,761

[22] Filed: May 15, 1992

[30] Foreign Application Priority Data

May 16, 1991 [JP] Japan ................................. 3-111750
May 11, 1992 [JP] Japan ................................. 4-117606

[51] Int. Cl.$^6$ ................................................. B32B 3/02
[52] U.S. Cl. ...................... 369/275.1; 369/286; 369/283; 369/272
[58] Field of Search ................................. 369/275.1, 286, 369/272, 100, 283, 284, 288; 346/135.1, 137, 76 L; 430/945, 502, 503

[56] References Cited

U.S. PATENT DOCUMENTS

| | | | |
|---|---|---|---|
| 4,189,735 | 2/1980 | Bell et al. | 346/135.1 |
| 4,300,143 | 11/1981 | Bell et al. | 346/76 L |
| 4,305,081 | 12/1981 | Spong | 346/135.1 |
| 5,021,276 | 6/1991 | Kamezaki et al. | 369/288 |
| 5,091,900 | 2/1992 | La Budde | 369/275.1 |
| 5,208,088 | 5/1993 | Tominaga et al. | 346/76 L |
| 5,260,165 | 11/1993 | Satou et al. | 430/271 |

FOREIGN PATENT DOCUMENTS

| | | |
|---|---|---|
| 0092707 | 11/1983 | European Pat. Off. . |
| 0289352 | 11/1988 | European Pat. Off. . |
| 2148148 | 5/1985 | United Kingdom . |

*Primary Examiner*—Davis L. Willis
*Assistant Examiner*—Don Wong
*Attorney, Agent, or Firm*—Fitzpatrick, Cella, Harper & Scinto

[57] ABSTRACT

An optical recording medium includes in sequence a transparent substrate, a light-reflecting layer, a transparent intermediate layer and a light-absorbing layer. The light-reflecting layer, the transparent intermediate layer and the light-absorbing layer in combination constitute a multi-layer optical element showing a high reflectance with respect to a reproducing light beam having a wavelength $\lambda_r$. The resultant high reflectance state in the non-recorded region provides a high contrast in comparison with a record pit when the high reflectance multi-layer optical element is destroyed, and also provides the record with an improved resistance to degradation due to irradiation with the reproducing light beam.

29 Claims, 6 Drawing Sheets

OPTICAL RECORDING MEDIUM, RECORDING SYSTEM AND REPRODUCING SYSTEM

FIELD OF THE INVENTION AND RELATED ART

The present invention relates to an optical recording medium (inclusive of a record blank and the resultant record) for optical information recording and reproduction, and a system (method and apparatus) for optical information recording and/or reproduction using the optical recording medium.

Optical recording media have received attention in recent years because of, e.g., capability of non-contact recording and reproduction and quick accessibility.

Optical recording media proposed heretofore may principally include the following types:

(a) One including a recording layer comprising a film of a low-melting point metal;

(b) One including a recording layer comprising a layer of an organic coloring matter showing a high reflectance; and (c) One including a recording layer having a two-layer structure including a metal reflection layer and an organic light-absorbing layer.

More specifically, an optical recording medium of the above type (a) includes a recording layer of a film comprising principally a low-melting point metal, such as Te, in which recording layer a pit is formed by producing a hole by light illumination or by causing a change in reflectance through a crystal-amorphous phase transition. The optical recording medium of this type is accompanied with problems, such as a poor storage stability and a high production cost, because vapor deposition, for example, is required for forming the recording layer.

An optical recording medium of the above type (b) has a structure, e.g., as shown in FIG. 4, including on a substrate 1 a recording layer of an organic coloring matter film 4 which is further laminated with a protective substrate 6 by the medium of an adhesive layer 5. This type of recording medium is expected to provide a high sensitivity and a high C/N ratio because the organic coloring matter film 4 shows a higher melting point and decomposition temperature and a lower thermal conductivity than a polymer. Further, the film formation can be effected by coating which is advantageous with respect to low production cost.

In the conventional optical recording medium of this type (b), the recording layer plays both roles of light reflection for information reproduction and light absorption for recording. The recording is effected by forming pits by converting absorbed light into heat energy and causing decoloration, melting, decomposition or/and sublimation of the coloring matter due to the heat, so that an increase in amount of absorbed light is required in order to provide a higher sensitivity. On the other hand, as for the reflectance, a wavelength giving a maximum reflectance is generally longer than a wavelength giving a maximum absorptance as shown in FIG. 5, so that there arises a contradictory problem that a maximum reflectance for providing an excellent S/N ratio can result in a shortage of absorption which leads to a lowering in sensitivity. For this reason, it has been difficult to effect both recording at a high sensitivity and reproduction at a high S/N ratio by using a single laser light source. Further, there is also a problem of degradation due to reproducing light that the recording layer can cause degradation (e.g., a lowering in reflectance) by irradiation with even weak laser light for reproduction which still causes some degree of heat generation.

Then, in the optical recording medium of the type (c), an organic light-absorption layer is irradiated with laser light to form pits therein due to heat generation in the absorption layer, and a metal reflection layer is provided to compensate for the low reflectance of the organic light-absorption layer (as disclosed in U.S. Pat. Nos. 4,189,735 and 4,305,081). In this type of optical recording medium, the problem of degradation due to reproducing light hardly occurs but, on the other hand, there is an accompanying difficulty that the recording sensitivity is remarkably impaired. Further, the production cost becomes higher because vapor deposition, etc., is required for forming the metal reflection film.

SUMMARY OF THE INVENTION

In view of the above-mentioned problems of the conventional optical recording media using an organic material, an object of the present invention is to provide an optical recording medium which can show a high reflectance for reproducing recorded information at a high contrast while retaining a high recording sensitivity and can be produced at a low production cost.

Another object of the present invention is to provide such an optical recording medium which does not readily cause degradation due to reproducing light.

A further object of the present invention is to provide an optical recording method and an optical reproducing method capable of producing high contrast signals.

A still further object of the present invention is to provide an information recording apparatus capable of information recording providing high contrast signals, and an information reproducing apparatus capable of reproducing the recorded information at a high contrast.

According to the present invention, there is provided an optical recording medium, comprising in sequence a transparent substrate, a light-reflecting layer, a transparent intermediate layer and a light-absorbing layer, wherein the light-reflecting layer, the transparent intermediate layer and the light-absorbing layer in combination constitute a multi-layer optical element showing a high reflectance with respect to a light beam having a prescribed wavelength.

According to the present invention, there is also provided an optical recording medium, comprising in sequence a transparent substrate, a light-reflecting layer, a transparent intermediate layer and a light-absorbing layer, wherein the light-reflecting layer, the transparent intermediate layer and the light-absorbing layer in combination constitute a multi-layer optical element showing a high reflectance with respect to a reproducing light beam having a wavelength $\lambda r$.

According to the present invention, there is further provided an optical recording medium for use in combination with a reproducing light beam having a prescribed wavelength and a prescribed intensity and a recording light beam having a wavelength different from the prescribed wavelength, comprising: in sequence, a transparent substrate, a light-reflecting layer, a transparent intermediate layer and a light-absorbing layer; the light-reflecting layer, transparent intermediate layer and light-absorbing layer having respectively prescribed thicknesses so as to constitute a multi-layer optical element showing a high reflectance with respect to a light beam having the prescribed wavelength; the light-reflecting layer, transparent intermediate layer and light-absorbing layer being comprised of such materials that an optically detectable change could be formed in the optical recording medium when irradiated with the reproducing light beam if the light-reflecting layer, transparent intermediate layer and light-absorbing layer were disposed in different thicknesses failing to provide such a high reflectance;

whereby the optical recording medium is capable of information recording so as to cause an optically detectable change in the light-reflecting layer by irradiation with the recording light beam and is capable of information reproduction without causing an optically detectable change by irradiation with the reproducing light beam.

According to the present invention, there is further provided an optical recording medium for use in combination with a reproducing light beam having a prescribed wavelength and a first intensity and a recording light beam having the same wavelength as the prescribed wavelength and a second intensity larger than the first intensity, comprising: in sequence, a transparent substrate, a light-reflecting layer, a transparent intermediate layer and a light-absorbing layer; the light-reflecting layer, transparent intermediate layer and light-absorbing layer having respectively prescribed thicknesses so as to constitute a multi-layer optical element showing a high reflectance with respect to a light beam having the prescribed wavelength; the light-reflecting layer, transparent intermediate layer and light-absorbing layer being comprised of such materials that an optically detectable change could be formed in the optical recording medium when irradiated with the reproducing light beam having the first intensity if the light-reflecting layer, transparent intermediate layer and light-absorbing layer were disposed in different thicknesses failing to provide such a high reflectance;

whereby the optical recording medium is capable of information recording so as to cause an optically detectable change in the light-reflecting layer by irradiation with the recording light beam and is capable of information reproduction without causing an optically detectable change by irradiation with the reproducing light beam.

According to the present invention, there is also provided an optical recording method, comprising:

providing an optical recording medium comprising in sequence a transparent substrate, a light-reflecting layer, a transparent intermediate layer and a light-absorbing layer; and focusing a light beam at the light-absorbing layer through the transparent substrate to provide an optically detectable change in both the light-absorbing layer and the light-reflecting layer for recording information.

The present invention further provides an optical recording method, comprising:

providing an optical recording medium comprising in sequence a transparent substrate, a first organic coloring matter layer, a transparent intermediate layer and a second organic coloring matter layer, the first and second organic coloring matter layers having mutually different maximum absorption wavelengths, each of the first organic coloring matter layer, transparent intermediate layer and second organic coloring matter layer having a prescribed thickness; and focusing a light beam at the second organic coloring matter layer through the transparent substrate to provide an optically detectable change at least at a focused part in the second organic coloring matter layer and a corresponding part in the first organic coloring matter layer for recording information; the light beam having a frequency and an intensity sufficient to be absorbed by the second organic coloring matter layer.

The present invention further provides an optical reproducing method, comprising:

providing an optical recording medium comprising in sequence a transparent substrate, a light-reflecting layer, a transparent intermediate layer and a light-absorbing layer; the light-reflecting layer and light-absorbing layer having mutually different maximum absorption wavelengths, each of the light-reflecting layer, transparent intermediate layer and light-absorbing layer having a prescribed thickness; and irradiating the optical recording medium with a reproducing light beam through the substrate to reproduce information; the reproducing light beam having a frequency and an intensity such that the optical recording medium shows a high reflectance state with respect to the reproducing light beam and is free from causing an optically detectable change when irradiated with the reproducing light beam.

The present invention further provides an information recording apparatus for writing in an optical recording medium which comprises in sequence a transparent substrate, a light-reflecting layer, a transparent intermediate layer and a light-absorbing layer, each of the light-reflecting layer and light-absorbing layer comprising an organic coloring matter layer; the apparatus including:

a light source for issuing a recording light beam, means for focusing the light beam at the light-absorbing layer of the optical recording medium, means for continuously moving the light-absorbing layer relative to the focused light beam, and means for modulating the light beam to have an intensity varying between a high level and a low level, so that the light beam at its high intensity level is focused at the light-absorbing layer to have a frequency and an intensity sufficient to be absorbed by the light-absorbing layer to provide an optically detectable change at a focused part in the light-absorbing layer and a corresponding part in the light-reflecting layer.

The present invention further provides an information reproducing apparatus for reproducing information recorded in an information record which comprises in sequence a transparent substrate, a light-reflecting layer, a transparent intermediate layer and a light-absorbing layer, a pit being formed as an optically detectable change at mutually corresponding parts in the light-absorbing layer and the light-reflecting layer, a series of such pits constituting an information track; the apparatus including:

a light source for issuing a reproducing light beam having a substantially constant intensity, means for focusing the reproducing light beam at the information track, means for continuously moving the information track relative to the focused reproducing light beam, and optical detection means for detecting the reproducing light beam reflected from the information track;

the reproducing light beam having a frequency and an intensity after the focusing such that the information record, at parts free from the pits, shows a high reflectance state with respect to the reproducing light beam and is free from causing an optically detectable change when irradiated with the reproducing light beam.

Thus, in the present invention, an optical recording medium is constituted to have a multi-layer optical element including an organic coloring matter layer as a light-reflecting layer, thereby forming an optical recording medium capable of reproducing a high contrast signal while retaining a good recording sensitivity by forming a high reflection state utilizing a light interference effect. Further, according to the recording method of the present invention, heat generated in the light-absorbing layer is utilized for forming an optically detectable change (pit) in both the light-absorbing layer and the light-reflecting layer to destroy a high-reflecting state of the optical recording medium, thus resulting in a low-reflecting recorded portion which shows a high contrast relative to a non-recorded portion (high-reflecting state).

Further, according to the present invention, the multi-layer optical element is caused to have a high reflectance leading to a substantially lower sensitivity to a light beam of the optical recording medium, thus suppressing the degradation due to reproducing light that the reflectance of the light-absorbing layer and light-reflecting layer is lowered by irradiation with reproducing light and allowing an increase in power of the reproducing light beam to provide a higher contrast signal.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
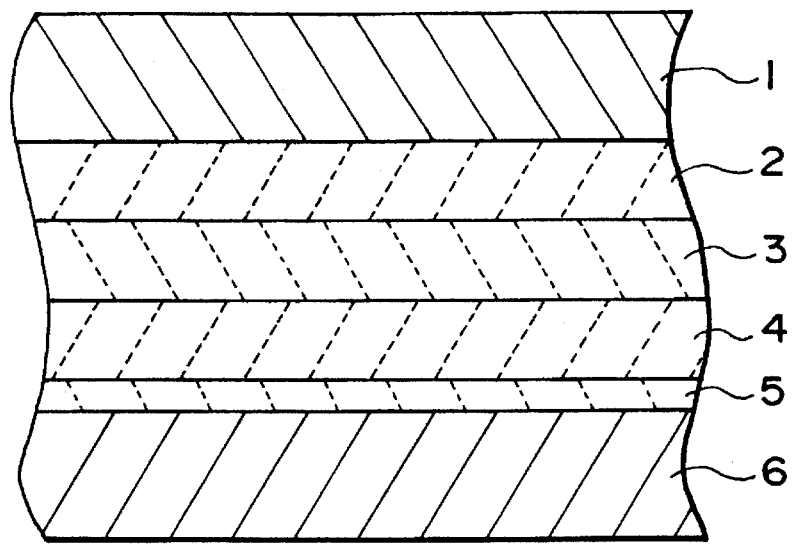
FIG. 1 is a schematic sectional view of an embodiment of the optical recording medium according to the present invention.
Figure 2:
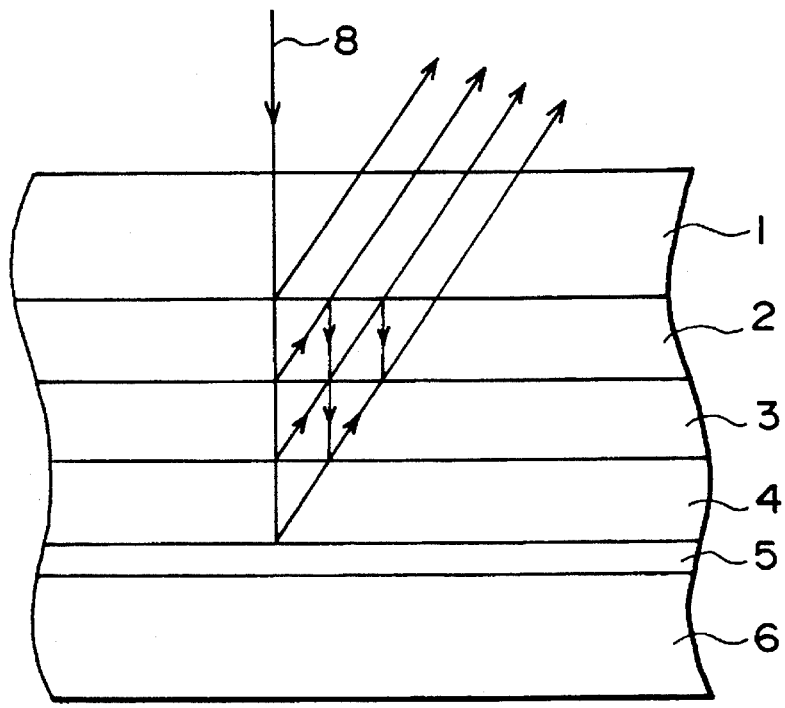
FIG. 2 is a schematic illustration of a reflection state of light incident to the optical recording medium according to the present invention.

FIG. 1 is a schematic sectional view of an optical recording medium according to the present invention. Referring to FIG. 1, the optical recording medium includes a transparent substrate 1, a light-reflecting layer 2, a transparent intermediate layer 3, a light-absorbing layer 4, an adhesive layer 5 and a protective substrate 6.

In the present invention, it is preferred that the light-reflecting layer 2 and light-absorbing layer 4 may respectively be comprised as an organic coloring matter layer, i.e., a layer comprising an organic coloring matter. The light-reflecting layer 2, transparent intermediate layer 3 and light-absorbing layer 4 may preferably form in combination a multi-layer optical element showing a high reflectance with respect to a reproducing light beam having a wavelength $\lambda r$ which is focused at the light-absorbing layer 4 through the transparent substrate due to an interference effect. The "high reflectance" used herein means a reflectance higher than that of either one of the light-reflecting layer and the light-absorbing layer, preferably at least 1.2 times, more preferably at least 1.3 times, the reflectance of either one of the light-reflecting layer and the light-absorbing layer showing a higher reflectance.

Thus, a light beam 8 incident through the transparent substrate 1 is reflected principally at the interface between the transparent substrate 1 and the light-reflecting layer 2, the interface between the light-reflecting layer 2 and the transparent intermediate layer 3, and the interface between the transparent intermediate layer 3 and the light-absorbing layer 4.

When the light-reflecting layer 2 and the light-absorbing layer 4 are respectively comprised as an organic coloring matter layer and the transparent intermediate layer 3 is comprised as a layer of a material having a smaller refractive index than the organic coloring matter layer, the reflected light at the interface between the light-reflecting layer 2 and the transparent intermediate layer 3 is caused to have a phase which is shifted by $\pi$ from those of the reflected light at the interface between the transparent substrate 1 and the light-reflecting layer 2 and the reflected light at the interface between the transparent intermediate layer 3 and the light-absorbing layer 4. As a result, a maximum reflectance at the incident face of the transparent substrate 1 is obtained when the thickness $d^{ref}$ of the light-reflecting layer is $\lambda r/4n^{ref}$ or an odd-number times thereof if the wavelength of the reproducing light beam is denoted by $\lambda r$ and the refractive index of the light-reflecting layer is denoted by $\hat{N}^{ref}=n^{ref}-ik^{ref}$ wherein $i=\sqrt{-1}$, n denotes the real part and k denotes the extinction coefficient of a material, particularly an organic coloring matter, constituting the relevant layer. Further, a maximum reflectance at the incident face of the transparent substrate 1 is obtained when the thickness $d^{int}$ of the transparent intermediate layer 3 is $\lambda r/4n^{int}$ or an odd-number times $\lambda r/4n^{int}$ if the refractive index of the intermediate layer is denoted by $\hat{N}^{int}=n^{int}-ik^{int}$.

Accordingly, in order to form a multi-layer optical element providing a high reflectance state in the present invention, it is preferred that the light-reflecting layer 2 and the transparent intermediate layer 3 have thicknesses $d^{ref}$ and $d^{int}$, respectively, within the ranges given by the following formulae (1) and (2).

$$(\lambda r/6n^{ref})\cdot(2l+1)<d^{ref}<(\lambda r/3n^{ref})\cdot(2l+1) \qquad (1)$$

$$(\lambda r/6n^{int})\cdot(2m+1)<d^{int}<(\lambda r/3n^{int})\cdot(2m+1) \qquad (2)$$

wherein l and m are respectively 0 or a positive integer.

A maximum reflectance at the incident face of the transparent substrate 1 is also obtained when the thickness $d^{abs}$ of the light-absorbing layer 4 is $(\lambda r/4n^{abs})\cdot(2p+1)$, wherein the refractive index of the light-absorbing layer 4 is denoted by $\hat{N}^{abs}=n^{abs}-ik^{abs}$, and p is 0 or a positive integer. However, the influence of the light-absorbing layer thickness $d^{abs}$ to the reflectance of the optical recording medium is smaller than those of the light-absorbing layer and transparent intermediate layer. In view of the absorption of the recording light beam having passed through the light-reflecting layer, it is rather preferred that the light-absorbing layer has a thickness in the range of $(\ln2\cdot\lambda w/2\pi\cdot k^{abs})$ to $(\lambda w/3n^{abs})$ wherein $\lambda w$ denotes the wavelength of the recording light beam. In order to increase the reflectance at the incident face of the optical recording medium according to the present invention, it is further preferred to use a reproducing light beam having a wavelength $\lambda r$ which is substantially equal to $\lambda(R^{ref}max)$, a wavelength giving a maximum reflectance of the light-reflecting layer.

In the optical recording medium of the present invention, it is preferred that the light-reflecting layer 2 and light-absorbing layer have maximum absorption wavelengths which are different from each other and it is particularly preferred to appropriately select the organic coloring matter constituting the light-reflecting layer 2 and light-absorbing layer 4 and/or the wavelength $\lambda w$ of the recording light beam so as to satisfy that $\lambda w$ is substantially equal to $\lambda^{abs}max$ and $$\lambda w > \lambda^{ref}max \qquad (3),$$

wherein $\lambda^{abs}max$ denotes the maximum absorption wavelength of the light-absorbing layer and $\lambda^{ref}max$ denotes the maximum absorption wavelength of the light-reflecting layer.

By satisfying the above relationships, the absorption maximum of the light-reflecting layer occurs at a wavelength which is shorter than the wavelength of the recording light beam so that the recording light beam is absorbed little by the light-reflecting layer but a higher reflectance is attained since the maximum reflection wavelength is generally longer than the maximum absorption wavelength. On the other hand, the maximum absorption wavelength of the light-absorbing layer 4 is made substantially equal to the wavelength of the recording light beam so as to provide an increased absorption efficiency of the light beam. As a result, an organic optical recording medium showing a high reflectance is provided while retaining a good recording sensitivity by suppressing a decrease in recording sensitivity accompanying the high reflectance at the surface.

In the present invention, it is further preferred to select the materials of the optical recording medium and/or the wavelength of the recording light beam so that the light-reflecting layer shows an absorptance of at most 20%, particularly at most 10%, with respect to a light beam having a wavelength $\lambda w$ equal to that of the recording beam, the transparent intermediate layer shows an absorption of at most 5%, particularly at most 1%, with respect to the light beam, and the light-absorbing layer shows an absorptance of at least 50%, particularly at least 60%, with respect to the light beam. According to the above setting, the recording light beam is not attenuated too much due to absorption by the light-reflecting layer so that the recording light beam is allowed to effectively reach the light-absorbing layer, whereby recording is effected at a good sensitivity by formation of pits in the light-absorbing layer and light-reflecting layer according to the present invention.

Further, in order to provide a high reflectance at the incident face of the optical recording medium due to an interference by the multi-layer optical element according to the present invention, it is preferred to select the materials of the light-reflecting layer and transparent intermediate layer and/or the wavelength of the reproducing beam so that the light-reflecting layer shows an absorptance of at most 20%, particularly at most 10%, with respect to a light beam having a wavelength $\lambda r$ equal to that of the reproducing beam, and the intermediate layer shows an absorption of at most 5%, particularly at most 1%, with respect to such a beam.

Now, the materials and characteristics of the respective layers constituting the optical recording medium according to the present invention will be described more specifically.

(1) Transparent Substrate

The transparent substrate 1 may suitably be transparent to laser light so as to allow recording and reproduction through the substrate. Accordingly, the substrate may comprise, e.g., plastics, such as polyester resin, acrylic resin, polyamide resin, polycarbonate resin, polyolefin resin, phenolic resin, epoxy resin and polyimide resin, and glass.

The surface of the substrate may be provided with a preformat, such as guide grooves, guide pits or address signals for tracking, which may be formed directly in the plastics or glass constituting the substrate or in a coating layer of, e.g., a photopolymer resin.

(2), (4) Light-reflecting Layer and Light-absorbing Layer

In the present invention, the light-reflecting layer and light-absorbing layer may respectively be constituted as a layer comprising an organic coloring matter, suitable examples of which may include dyes of polymethine-type, azulene-type, pyrylium-type, squalium-type, croconium-type, triphenylmethane-type, xanthene-type, anthraquinone-type, cyanine-type, phthalocyanine-type, dioxazine-type, tetrahydrocholine-type, triphenothiazine-type, phenanthrene-type, aminium salt-diimmonium slat-type, and metal complex-type. Pigments of similar structures can also be used.

One or more of the above coloring matters may be selected appropriately in view of the maximum absorption wavelength and the maximum reflection wavelength. As described above, the light-absorbing layer may preferably be comprised by a material providing a maximum absorption wavelength $\lambda^{abs}max$ which is substantially equal to $\lambda w$, the wavelength of the recording light beam, and the light-reflecting layer may preferably be comprised by a material providing a maximum reflection wavelength $\lambda(R^{ref}max)$ which is substantially equal to $\lambda r$, the wavelength of the reproducing light beam.

In the present invention, the above-mentioned substantial equality between $\lambda w$ and $\lambda^{abs}max$ is satisfied when $\lambda w$ is within a wavelength region in which a single layer of the light-absorbing layer shows 0.7 to 1.1 times the maximum absorptance which the single layer of the light-absorbing layer shows with respect to light having the wavelength of $\lambda^{abs}max$. Further, the above-mentioned substantial equality between $\lambda r$ and $\lambda(R^{ref}max)$ is satisfied when $\lambda r$ is within a wavelength region in which a single layer of the light-reflecting layer shows 0.7 to 1.1 times the maximum absorptance which the single layer of the light-reflecting layer shows with respect to light having the wavelength of $\lambda(R^{ref}max)$.

Further, as described above, the light-absorbing layer may preferably show an absorptance of at least 50%, particularly at least 60%, with respect to the recording light beam, and the light-reflecting layer may preferably show an absorptance of at most 20%, particularly at most 10%, with respect to both the recording light beam and the reproducing light beam, whereby recording can be performed at a high sensitivity to provide a record and the record can be reproduced at a high contrast.

An optical stabilizer, such as an aminium salt or diimonium salt, can be used together with the above-mentioned organic coloring matter. The light-reflecting layer and the light-absorbing layer may suitably be formed as binder-free layers, but an appropriate binder can be included in the light-reflecting layer and/or the light-absorbing layer in order to improve the film-forming characteristic.

(3) Transparent Intermediate Layer

The transparent intermediate layer 3 may be comprised by a material which shows substantial transparency, more specifically an absorptance of at most 5%, particularly at most 1%, with respect to both laser light beams having wavelengths λw and λr and may be formed in a thickness in the range of from $(\lambda r/6n^{int})\cdot(2m+1)$ to $(\lambda r/3n^{int})\cdot(2m+1)$, wherein m is 0 or a positive integer. Examples of the material may include: organic resins, such as polyvinyl alcohol and polyvinyl acetal resin, polyurethane resin, polyamide resin, polystyrene resin, cellulose derivatives, ethylene-vinyl acetate copolymer, ethylene-acrylic acid copolymer, polyolefin resin and copolymers thereof, polycarbonate resin, acrylic resin, silicone resin, polyester resin, polyparaxylene, and petroleum resin; and inorganic materials, such as SiO, $SiO_2$, $CS_2$, and $Si_3N_4$.

In the present invention, it is preferred to comprise the transparent intermediate layer 3 with a resin soluble in a solvent which is a non-solvent for the organic coloring matter constituting the light-reflecting layer or light-absorbing layer. A suitable class of such resins may include water-soluble resins, of which polyvinyl alcohol is particularly preferred because the recording sensitivity of the optical recording medium can be improved and the deterioration of the organic coloring matter constituting the light-reflecting layer and the light-absorbing layer can be remarkably suppressed thereby. The reason why the use of polyvinyl alcohol provides such excellent advantages is not clear but the overall physical properties including thermal diffusivity of polyvinyl alcohol may be assumed to contribute to the effects.

The optical recording medium according to the present invention may be prepared, e.g., by coating a transparent substrate 1 in sequence with an organic coloring matter layer (light-reflecting layer 2), a transparent intermediate layer 3 and an organic coloring matter layer (light-absorbing layer 4) respectively in prescribed thicknesses by various coating methods, vapor deposition, plasma polymerization, CVD process, etc., and the light-absorbing layer 4 may be further covered with a protective layer 6 by the medium of an adhesive layer 5.

Figure 3:
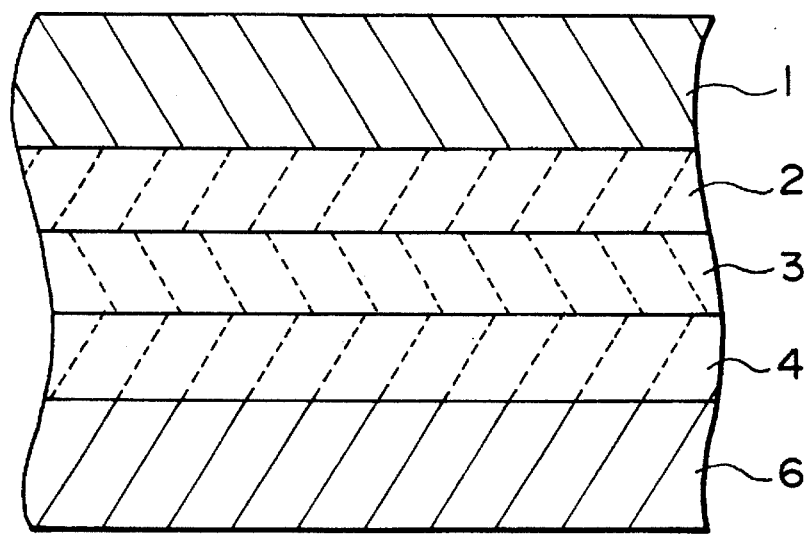
FIG. 3 is a schematic sectional view of another embodiment of the optical recording medium according to the present invention.
Figure 4:
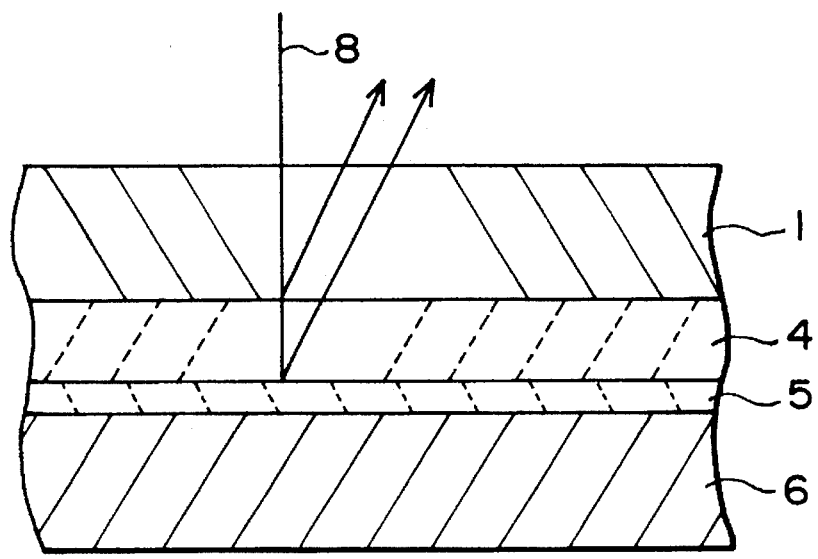
FIG. 4 is a schematic illustration of a conventional optical recording medium and a reflection state of light incident to the optical recording medium.
Figure 5:
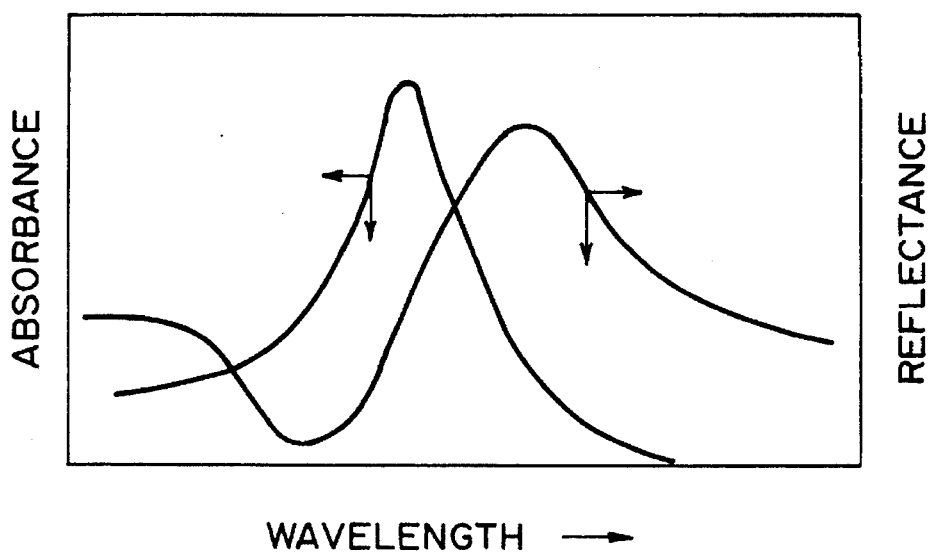
FIG. 5 is a graph showing a relationship of the absorptance and reflectance of an organic coloring matter versus the wavelength.

In a case when the transparent intermediate layer 3 is comprised by a material showing an adhesiveness, an optical recording medium as shown in FIG. 3 may be constituted by forming a light-reflecting layer 2 on a transparent substrate 1, forming a light-absorbing layer 4 on a protective substrate 6, and bonding the light-reflecting layer 2 and the light-absorbing layer 4 with the transparent intermediate layer 3.

Figure 6:
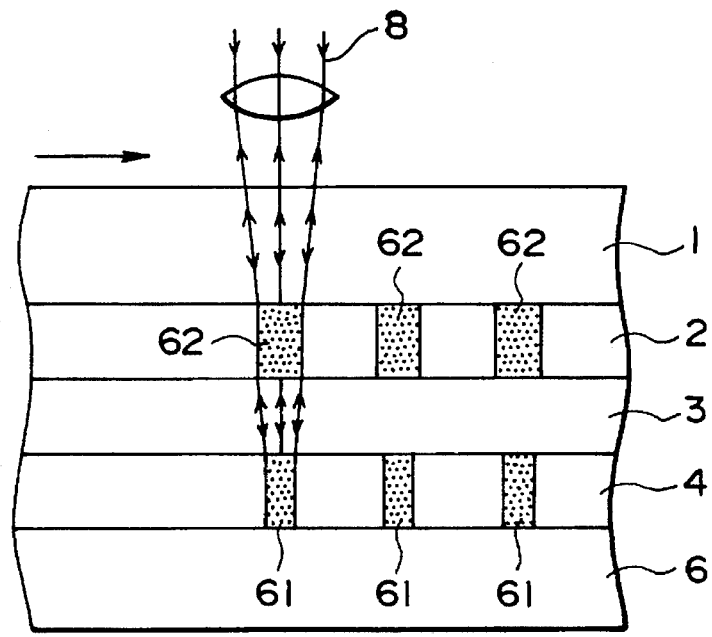
FIGS. 6 and 7 are respectively an illustration of information recording and reproduction by using an optical recording medium according to the present invention.

Next, information recording and reproducing methods using the optical recording medium according to the present invention will now be described with reference to FIG. 6. In the recording method, a recording light beam 8 is incident to an optical recording medium comprising a transparent substrate 1, a light-reflecting layer 2 comprising an organic coloring matter, a transparent intermediate layer 3 and a light-absorbing layer 4 comprising an organic coloring matter. More specifically, the recording light beam 8 is incident through the transparent substrate 1 and focused at the light-absorbing layer 4 to form an optically detectable change (pits) at the light beam-focused parts 61 in the light-absorbing layer 4 and the corresponding parts 62 in the light-reflecting layer 2.

In the optical recording method according to the present invention, the recording light beam 8 incident to the transparent substrate 1 is first reflected at the surface of the light-reflecting layer 2. However, unlike in the case of using a metal reflecting layer, some portions of the incident light beam are allowed to pass through the light-reflecting layer 2 and the transparent intermediate layer 3 to be focused at the light-absorbing layer 4 since the light-reflecting layer 2 in the present invention comprises an organic coloring matter. The focused light beam is absorbed and converted into heat at the light-absorbing layer, whereby optically detectable changes, such as deformation, decoloration, color change or a combination of these, are formed at the light beam-focused parts in the light-absorbing layer 4 and the corresponding parts in the light-reflecting layer 2 to effect recording. Then, a reproducing light beam is incident through the transparent substrate 1 and reflected light from the optical recording medium is detected to effect information reproduction.

At this time, the reproducing light beam is set to have a frequency or wavelength at which the light-reflecting layer, the transparent intermediate layer and the light-absorbing layer of the organic coloring matter in combination function as a multi-layer optical element showing a high reflectance at non-record portions in contrast with the record portions where the changes, such as deformation and decoloration, have occurred in the light-absorbing layer and light-reflecting layer to destroy the multi-layer optical element, thus showing a lower reflectance. In this way, a record providing a good contrast is formed.

Further, by forming a multi-layer optical element showing a high reflectance, the sensitivity to the reproducing light beam of the optical recording medium can be lowered substantially, so that high-power reproducing light can be used to provide a high contrast reproduction signal without damaging the optical recording medium, i.e., without causing deformation, decoloration, etc. of the light-absorbing layer and light-reflecting layer.

More specifically, a reproducing light beam having such a high intensity as to cause an optical change such as a lower reflectance in the light-absorbing layer if the multi-layer optical element were to fail to show a high reflectance, can still be used for the optical recording medium including a multi-layer optical element showing a high reflectance without causing a detectable optical change, thus being able to provide a high contrast reproduction signal.

Further, by selecting a wavelength of the reproducing light beam which is substantially equal to the maximum reflectance wavelength $\lambda(R^{ref}max)$ of the light-reflecting layer, the reflectance of the optical recording medium can be further increased.

Incidentally, in the information recording according to the present invention, formation of an optically detectable change in only one of the light-absorbing layer and the light-reflecting layer may be insufficient to destroy the multi-layer optical element showing a high reflectance, thus failing to provide a high contrast reproduction signal. It is therefore desirable to cause an optically detectable change in both the beam-focused parts 61 in the light-absorbing layer and the corresponding parts 62 in the light-reflecting layer.

For this purpose, it is preferred+to use a recording light beam having a frequency and an intensity suitable for causing a degree of absorption in the light-absorbing layer sufficient to provide an optically detectable change in both the light-focused parts 61 in the light-absorbing layer and the corresponding parts 62 in the light-reflecting layer without damaging the transparent substrate 1.

Further, by selecting a wavelength λw of the recording light beam which is substantially equal to the maximum absorption wavelength $\lambda^{abs}max$ of the light-absorbing layer, it is possible to provide the optical recording medium with a high recording sensitivity. In a case when the wavelength λw of the recording light beam and the wavelength λr of the reproducing light beam are equal to each other in the present invention, it is particularly preferred to set λw and $\lambda^{abs}$max to be substantially equal to each other as described above. This is because the optical recording medium according to the present invention is constituted to show a high reflectance at the wavelength of the reproducing light beam as described above, and the sensitivity to the recording light beam of the optical recording medium is also substantially lowered in the case when the wavelengths of the recording light beam and the reproducing light beam are equal to each other. By setting λw and $\lambda^{abs}$max equal to each other, however, it is possible to control the sensitivity of the optical recording medium to the recording light beam to such a level that a light beam having an excessive power is not required for recording.

A mechanism of pit formation in both the light-absorbing layer and the light-reflecting layer in the present invention has not been fully clarified, but it has been observed that pit formation is possible even in a light-reflecting layer showing almost no absorption. From this, the following may be assumed. When a light beam having a recording power is incident through the transparent substrate of the optical recording medium, a part of the light having passed through the light-reflecting layer and the transparent intermediate layer is absorbed in the light-absorbing layer and converted into heat to heat the light-absorbing layer. Simultaneously, a part of the heat is conducted through the intermediate layer to heat the corresponding parts of the light-reflecting layer. In this way, pits are formed in both the light-absorbing layer and light-reflecting layer.

It is also assumed that a deformation pit in the light-reflecting layer may be contributed by a pit deformation in the light-absorbing layer.

Figure 7:
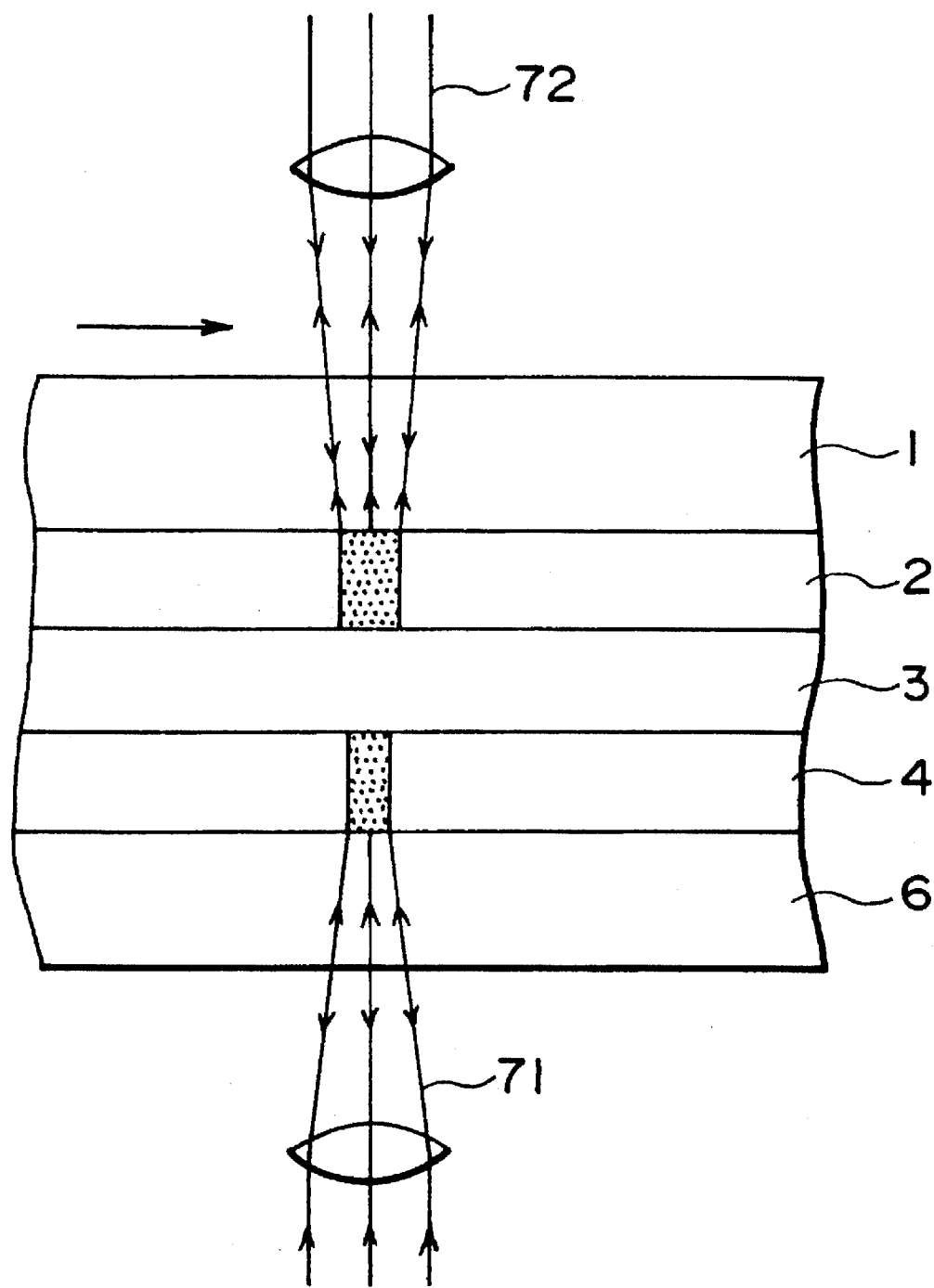

Incidentally, in the present invention, it is also possible as shown in FIG. 7 to form pits in both the light-absorbing layer 4 and light-reflecting layer 2 by using a recording light beam 71 incident through a protective substrate 6 and reproduce the pits by using a reproducing light beam 72 incident through a transparent substrate 1 having a surface showing a high reflectance. In this case, substantially no decrease in recording sensitivity is caused even if a recording light beam has a wavelength equal to that of the reproducing light beam.

Figure 8:
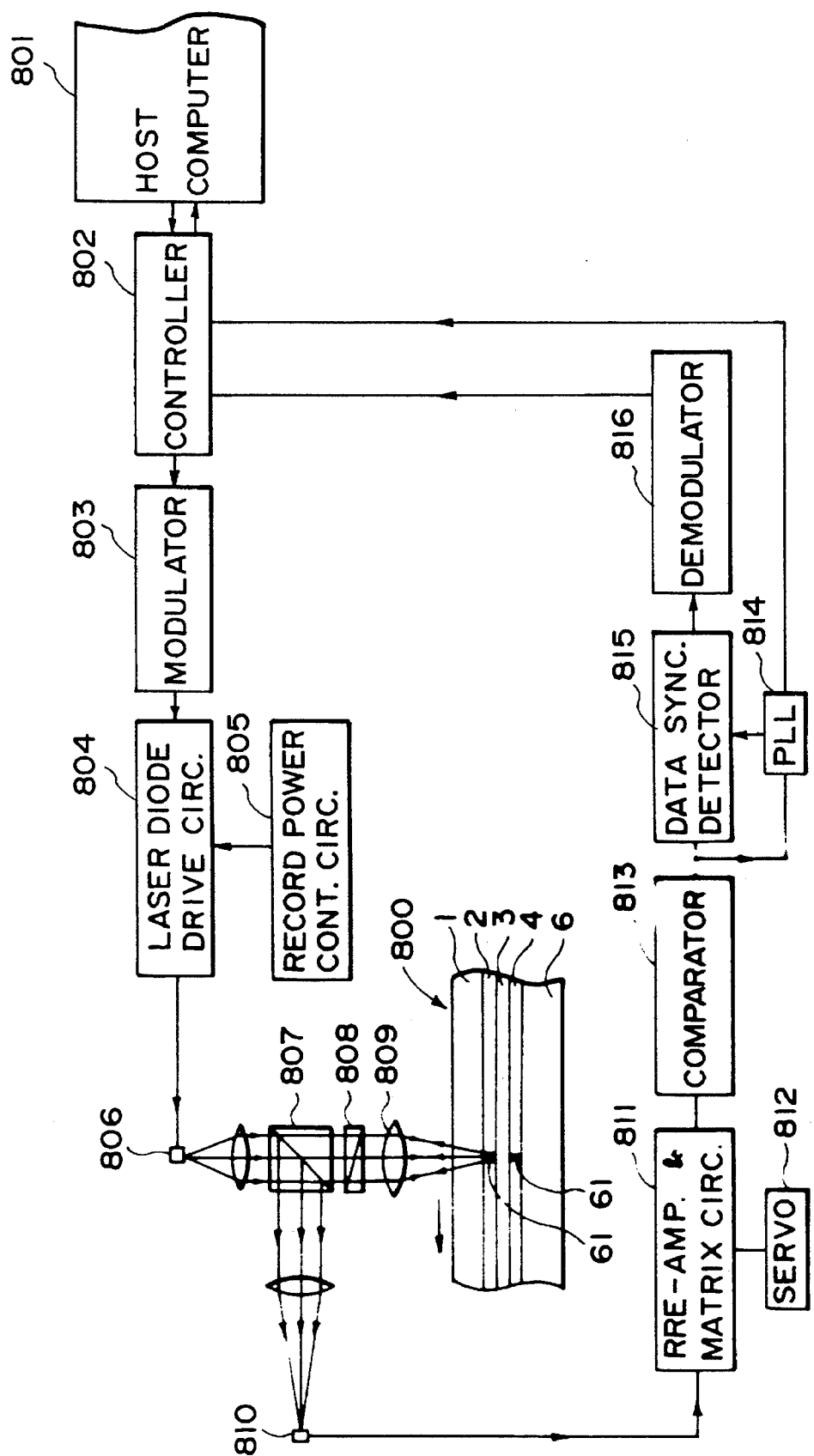
FIG. 8 is a block diagram illustrating an information recording and reproducing apparatus using an optical recording medium according to the present invention.

Next, an outline of information recording and reproduction using an optical recording medium (record blank) according to the present invention will be described with reference to FIG. 8 showing an outline of a recording/reproducing system including the optical recording medium.

Information recording is first explained. Referring to FIG. 8, an information recording and reproducing system as shown includes a record blank 800 (similar to the one shown in FIG. 3) which is moved by a driving means (not shown). Recording data sent from a host computer 801 is subjected to parallel-to-serial data conversion, addition of error correction code, etc. by a controller 802 for controlling the apparatus for recording and reproducing data in and from the medium 800, and then the serial data is converted into code signals by a modulating circuit 803. The coded signal data is sent through a laser diode drive circuit 804 connected to a recording power control circuit 805 to a laser diode 806, which issues a recording light beam having varying intensities changing between a high level and a low level depending on the modulated data. The recording light beam passing a polarizing beam splitter 807 is converted into circular polarized light when it passes through a quarter wave plate 807. The circular polarized light is focused by a condenser lens 809 into a spot beam with a diameter of about 1 µm, which is then incident to the recording medium 800 from the side of the substrate 1 to be focused at the light-absorbing layer 4.

As a result, when the intensity of the recording light beam is at its high level, the light beam-focused part of the light-absorbing layer 4 of the record blank 800 is heated to cause an optically detectable change 61 thereat in the light-absorbing layer 4 and also an optically detectable change 62 at the corresponding part in the light-reflecting layer 2. On the other hand, when the intensity is at its low level, no-change occurs in the light-absorbing layer or light-reflecting layer. As a result, at the part provided with the optically detectable changes in the light-absorbing layer and the light-reflecting layer, the multi-layer optical element showing a high reflectance with respect to a reproducing light beam is locally broken to provide a part showing a low reflectance with respect to the reproducing light beam, thus resulting in a record pit. The record blank 800 including the light-absorbing layer 4 is moved by the driving means (not shown) successively relative to the recording light beam, whereby an information or data track comprising a series of such record pits is formed. The medium 800 having a plurality of such record pits or such information tracks each including a plurality of record pits provides an information record.

Next, the information reproduction operation is explained.

In the reproduction mode, the output power level of the laser diode 807 is fixed by the control circuit 803–805 to a constant level below that required for forming an optically detectable change in the light-absorbing layer 4. The reproducing laser beam at a constant level is passed through the polarizing beam splitter 807, the quarter wave plate 808 and the condenser lens 809 to be focused onto an information track to reproduce the information of the record 800. Then, the light reflected from the information record surface is again passed through the quarter wave plate 808 after which the reflected light is caused to have a polarized light plane which is different by 90 degrees from the incident light and is reflected by the beam splitter 807 to reach an optical detector 810. The intensity of the light entering the detector 810 is changed when the focused beam passes over the record pit comprising the parts 61 and 62 in the light-absorbing layer 4 and light-reflecting layer 2.

The output from the optical detector 810 is amplified and transformed into a reproduced signal, a focus servo signal and a tracking servo signal by a pre-amplifier and matrix circuit 811. The focus servo signal and tracking servo signal are sent to a servo control system 812. The reproduced signal outputted from the matrix circuit 811 is converted into a digital signal by a comparator 813 and sent to a phase locked loop (PLL) circuit 814 at which a clock signal is extracted. The clock signal is used for synchronizing demodulation of the reproduced signal at a data synchronizing and detection system 815. Then, the signal from the detection system 815 is demodulated by a demodulator circuit 816 according to an algorithm reverse to that for the modulation into data of the original type, which is then sent to the controller 802 to be read by the host computer 801.

The laser diode 806, beam splitter 807, quarter wave plate 808, condenser lens 809 and optical detector 810 in combination form an optical head, which is driven to an objective track for recording and reproduction based on the data from the controller 802, and the movement of the optical head and the medium 800 is controlled by the servo control system 812 based on signals including the focus servo signal and tracking servo signal sent from the matrix circuit 811.

It is possible to use different wavelengths for the recording light and the reproducing light beam.

As described above, it is possible to form an optical recording medium, which provides a record having a high contrast at a good recording sensitivity and is less susceptible of degradation due to reproducing light, by laminating on a transparent substrate an organic light-reflecting layer, a transparent intermediate layer and an organic light-absorbing layer so as to constitute a multi-layer optical element showing a high reflectance with respect to a reproducing light beam. The respective layers can be formed without using an expensive vacuum film forming step so that the production cost can be suppressed.

Hereinbelow, the present invention will be described based on Examples.

EXAMPLE 1

A polycarbonate-based optical disk substrate having a thickness of 1.2 mm, a diameter of 130 mm and a 15 mm-dia. central hole and provided on its surface with a spiral guide groove of 0.6 µm in width and 900 Å in depth formed at pitch of 1.6 µm by the so-called 2P process, was surface-coated with a 900 Å-thick light-reflecting layer in an annular shape having an inner radius of 20 mm and an outer radius of 63 mm formed by spin-coating of a dichloroethane solution of an organic coloring matter represented by the following structural formula [I]:

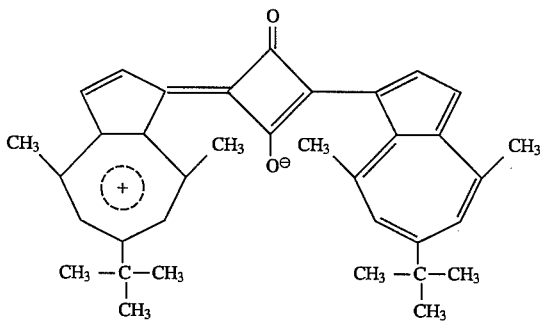

More specifically, the solution was prepared by dissolving the compound of the formula [I] in dichloroethane at a concentration of 2.0 wt. % and dripped and spread over the disk substrate rotating at 3000 rpm for 90 sec.

Then, on the light-reflecting layer, a 3 wt. % aqueous solution of polyvinyl alcohol (trade name: "Poval PVA 205", available from Kuraray K.K.) was dripped and spread for 60 sec. while rotating the disk substrate at 3000 rpm, followed by drying to form a 1400 Å-thick transparent intermediate layer of polyvinyl alcohol.

On the other hand, a protective substrate of the same size and material as the above-mentioned disk substrate was coated with a 1000 Å-thick light-absorbing layer also in an-annular shape having an inner radius of 20 mm and an outer radius of 6.3 mm formed by spin-coating of a diacetone alcohol solution of an organic coloring matter of the structural formula [II] below:

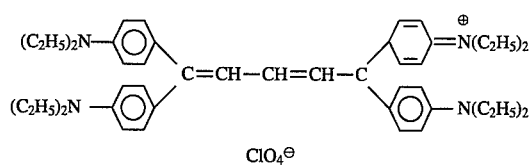

The solution was prepared by dissolving the compound of the formula [II] in diacetone alcohol at a concentration of 5.5 wt. % and dripped and spread for 90 sec. over the protective substrate while rotating the protective substrate at 3000 rpm.

Figure 9A:
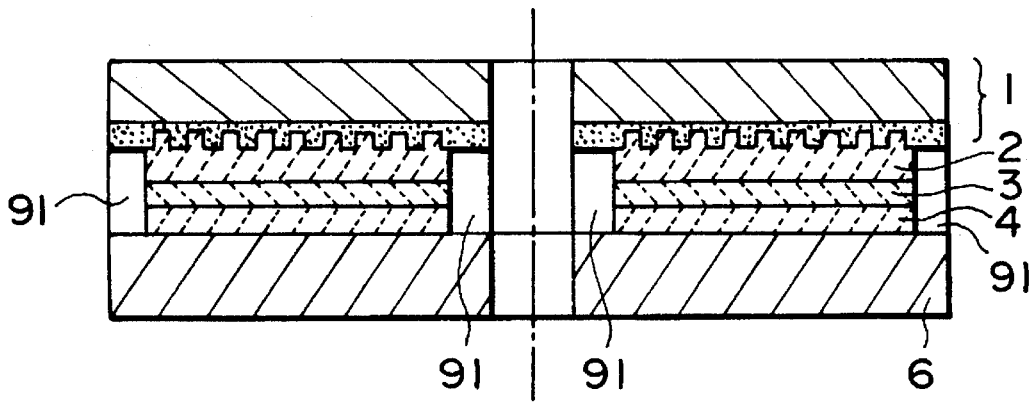
FIGS. 9A and 9B are schematic sectional views of optical recording media according to the present invention prepared in Examples 1 and 2, respectively, described hereinafter.

Then, as shown in FIG. 9A, an ultraviolet-curable adhesive 91 (trade name: "KRX-650-4", available from Asahi Denka K.K.) was applied at inner and outer peripheral parts of the disk substrate 1 and the protective substrate 6, and these substrates were applied to each other so that the transparent intermediate layer 3 and the light-absorbing layer 4 contacted each other, whereby an optical disk (record blank) having a cross-section as shown in FIG. 9A was prepared.

Incidentally, in the optical disk of this example, the thickness of the light-absorbing layer was determined so as to be within the range of $(\ln2 \cdot \lambda w/2\pi \cdot k^{abs})$ to $(\lambda w/3n^{abs})$ and be approx. $\lambda r/4n^{abs}$ with respect to the wavelength ($\lambda w=\lambda r=$ 830 nm) of the recording light beam and reproducing light beam in view of the organic coloring matter of the formula [II] showing a refractive index $\tilde{N}^{abs}=2.1-1.0i$ (i.e., $n^{abs}=2.1$, $k^{abs}=1.0$); similarly, the thickness of the transparent intermediate layer was determined so as to be approx. $\lambda r/4\tilde{N}^{int}$ in view of the polyvinyl alcohol showing a refractive index $\tilde{N}^{int}=1.52$; and the thickness of the light-reflecting layer was determined so as to be approx. $\lambda r/3.9n^{ref}$ in view of the organic coloring matter of the formula [I] showing a refractive index $\tilde{N}^{ref}=2.4-0.1i$ (i.e., $n^{ref}=2.4$, $k^{ref}=0.1$). Herein, n and k denote the real part of the refractive index and the extinction coefficient, respectively, of a material constituting the light-absorbing layer and light-reflecting layer denoted by superfixes abs and ref, respectively.

The reflectance of the optical disk was measured by irradiating the disk with a light beam having a wavelength of 830 nm incident from the transparent substrate side at an angle of incidence of 5 degrees and by using a spectrophotometer (trade name: "U-3400", available from Hitachi Seisakusho K.K.) corrected with a vapor-deposited aluminum film.

The optical disk was set in an optical disk evaluating apparatus (trade name: "OMS-1000", available from Nakamichi K.K.) and subjected to information recording by irradiating the optical disk rotated at a linear speed of 5.6 m/sec with a recording light beam incident through the transparent substrate and having a wavelength of 830 nm, a beam spot diameter of 1.6 µm and power of 8.0 mW at a recording pulse width of 0.2 µsec.

After the recording, the protective substrate and the transparent substrate of the optical disk were respectively peeled off and observed through an optical microscope, whereby pits comprising deformation and decoloration were recognized in both the light-absorbing layer and the light-reflecting layer.

Separately, another optical disk prepared and subjected to information recording in quite the same manner as described above was again set in the above-mentioned optical disk evaluating apparatus and subjected to information reproduction by irradiating the disk with a reproducing light beam having a wavelength of 830 nm, a beam spot diameter of 1.6

μm and a power of 0.5 mW to measure the recording contrast (=$(R_1-R_2)/R_1$ wherein $R_1$: reproduced signal level from the non-record part and $R_2$: reproduced signal level from the record part). Then, the same reproducing light beam was used to irradiate a particular track of the optical disk $10^6$ times for repetitive reproduction, and the change of the reproduced signal (RF output) was measured (reproduction durability test). The results are shown in Table 1 appearing hereinafter.

Comparative Example 1

An optical disk was prepared by forming only the light-reflecting layer on the optical disk substrate in Example 1. By using the optical disk, the light-reflecting layer also used in Example 1 was subjected to measurement of the maximum absorption wavelength, the maximum reflection wavelength, the maximum absorptance and the maximum reflectance by using the spectrophotometer. The reflectance and the absorptance with respect to light having a wavelength of 830 nm were also measured in the same manner as in Example 1. Further, the optical disk was subjected to information recording and reproduction to measure the recording contrast and also to the reproduction durability test in the same manner as in Example 1.

Comparative Example 2

An optical disk was prepared by forming only the light-absorbing layer on the optical disk substrate in Example 1. By using the optical disk, the maximum absorption wavelength and the maximum absorptance of the light-absorbing layer and also the reflectance and absorptance with respect to light of 830 nm in wavelength were measured in the same manner as in Comparative Example 1. Further, the optical disk was subjected to information recording and reproduction for measuring the recording contrast and also to the reproduction durability test in the same manner as in Example 1.

The results of Comparative Examples 1 and 2 are also shown in Table 1 below.

Table 1 shows that the optical disk of Example 1 showed a higher reflectance than the light-reflecting layer alone or the light-absorbing layer alone and allowed recording at an excellent contrast. It is also shown that the optical disk of Example 1 was less liable to cause deterioration due to reproducing light as indicated by little decrease in RF output after the repetitive reproduction.

EXAMPLE 2

Figure 9B:
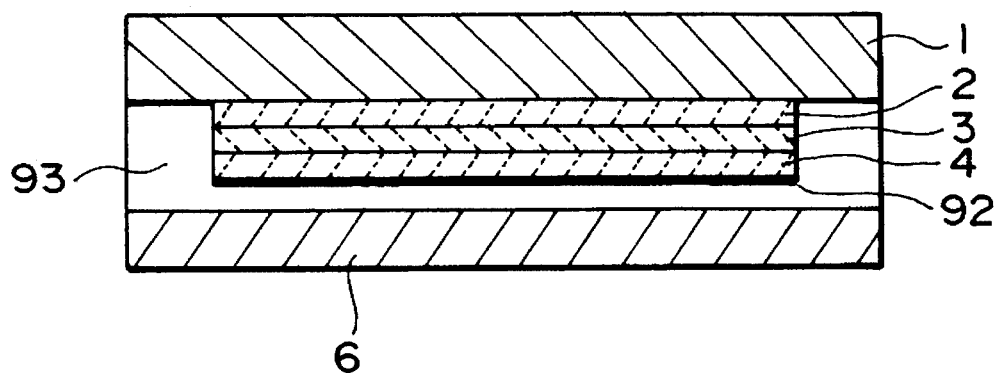

An optical card having a cross section as shown in FIG. 9B was prepared in the following manner.

First, an optical card substrate 1 was prepared by coating a 0.4 mm-thick acrylic resin plate of 76 mm in longer side and 54 mm in shorter side with a layer of a photopolymer resin (trade name: "30×717", available from Three Bond K.K.) to which was transferred a pattern of stripe-shaped guide grooves of 3 μm in width, 12 μm in pitch and 2500 Å in depth by the 2-process. The substrate 1 was coated with about a 900 Å-thick light-reflecting layer 2 formed by spin coating by applying a 2 wt. % dichloroethane solution of a compound of the following structural formula [III] while rotating the substrate at 3000 rpm for 60 sec.

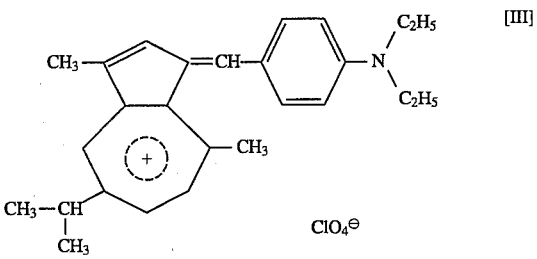

Separately, a 50 μm-thick PET (polyethylene terephthalate) film 92 (70 mm×50 mm) was coated by spin coating with about a 1000 Å-thick light-absorbing layer 4 of the above-mentioned compound of the formula [II] and further with about a 1400 Å-thick transparent intermediate layer of polyvinyl alcohol (trade name: "Poval PVA 205", available

TABLE 1

|  | Example 1 | Comp. Example 1 (light-reflecting layer alone) | Comp. Example 2 (light-absorbing layer alone) |
| --- | --- | --- | --- |
| Reflectance of optical disk (at 830 nm) | 52% | 39% | 20% |
| Maximum absorption wavelength of the light-reflecting layer | — | 760 nm | — |
| Maximum reflection wavelength of the light-reflecting layer (maximum reflectance of the light-reflecting layer alone) | — | 835 nm (43%) | — |
| Maximum absorption wavelength of the light-absorbing layer (maximum absorptance of the light-absorbing layer alone) | — | — | 850 nm (62%) |
| RF output change after the repetitive reproduction | 3% | 0% | >25% |
| Recording contrast | 0.7 | 0.2 | 0.48 |
| Absorptance at 830 nm used for recording | — | 3% | 60% | from Kuraray K.K.) by applying a 3 wt. % aqueous solution of the polyvinyl alcohol by spin coating at 3000 rpm for 60 sec.

Then, the optical card substrate and the PET film were laminated with each other so that the light-reflecting layer and the transparent intermediate layer contacted each other, followed by lamination on the PET film of a 50 µm-thick ethylene-vinyl acetate copolymer sheet 93 (trade name: "EV210", available from Mitsui Du Pont K.K.) and a 0.25 mm-thick acrylic protective plate 6 and heat lamination of the entire laminate to form an optical card.

In the optical card of this example, the thickness of the light-reflecting layer was determined so as to be approx. $\lambda r/4n^{ref}$ with respect to the wavelength ($\lambda w = \lambda r = 830$ nm) of the recording and reproducing light beam in view of the compound of the formula [III] showing a refractive index $\hat{N}^{ref}=2.3-0.05$ (i.e., $n^{ref}=2.3$, $k^{ref}=0.05$, at 830 nm); similarly, the thickness of the transparent intermediate layer was determined so as to be approx. $\lambda r/4\hat{N}^{int}$ in view of the polyvinyl alcohol showing a refractive index $\hat{N}^{int}=1.52$; and the thickness of the light-absorbing layer was determined so as to be approx. $\lambda r/4n^{abs}$.

The reflectance of the optical card thus prepared was measured by irradiating the card with a light beam having a wavelength of 830 nm in the same manner as in Example 1. The optical card was further set in an optical card recording/reproducing apparatus (available from Canon K.K.) and subjected to information recording by irradiating the optical card driven at a speed of 60 mm/sec with a recording light beam incident through the transparent substrate and having a wavelength of 830 nm, a beam diameter of 3 µm and a power of 3.5 mW at a recording pulse width of 60 µsec.

After the recording, the protective substrate and the transparent substrate of the card were peeled from each other to observe the record pits where deformation and decoloring were observed in both the light-absorbing layer and the light-reflecting layer.

Separately, another optical card prepared and subjected to information recording in quite the same manner as above was again set in the above optical card recording/reproducing apparatus and subjected to information reproduction by irradiating the card with a reproducing light beam having a wavelength of 830 nm, a beam diameter of 3 µm and a power of 0.2 mW to measure the recording contrast.

The results are shown in Table 2 appearing hereinafter.

Comparative Example 3

An optical card was prepared by forming only the light-reflecting layer on the optical card substrate in Example 2. By using the optical card, the light-reflecting layer also used in Example 2 was subjected to measurement of the maximum absorption wavelength, the maximum reflection wavelength, the maximum absorptance and the maximum reflectance by using the spectrophotometer. The reflectance and the absorptance with respect to light having a wavelength of 830 nm were also measured in the same manner as in Example 2. Further, the optical card was subjected to information recording and reproduction to measure the recording contrast in the same manner as in Example 2.

Comparative Example 4

An optical card was prepared by forming only the light-absorbing layer on the optical card substrate in Example 2. By using the optical card, the maximum absorption wavelength and the maximum absorptance of the light-absorbing layer and also the reflectance and absorptance with respect to light of 830 nm in wavelength were measured in the same manner as in Comparative Example 3. Further, the optical card was subjected to information recording and reproduction for measuring the recording contrast in the same manner as in Example 2.

The results of Comparative Examples 3 and 4 are also shown in Table 2 below.

TABLE 2

|  | Example 2 | Comp. Example 3 (light-reflecting layer alone) | Comp. Example 4 (light-absorbing layer alone) |
| --- | --- | --- | --- |
| Reflectance of optical card (at 830 nm) | 47% | 32% | 20% |
| Maximum absorption wavelength of the light-reflecting layer | — | 620 nm | — |
| Maximum reflection wavelength of the light-reflecting layer (maximum reflectance of the light-reflecting layer alone) | — | 770 nm (36%) | — |
| Maximum absorption wavelength of the light-absorbing layer (maximum absorptance of the light-absorbing layer alone) | — | — | 850 nm (62%) |
| Recording contrast | 0.65 | <0.1 | 0.51 |
| Absorptance at 830 nm used for recording | — | 1% | 60% |

EXAMPLE 3

An optical card was prepared in the same manner as in Example 2 except that the light-absorbing layer was prepared by using instead of the compound of formula [II] alone, a 4:1 (by weight) mixture of the compound of the formula [II] and a compound of the following formula [IV]:

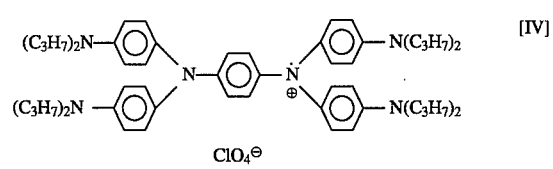

Then, each of the optical cards obtained in this Example 3 and the above-mentioned Example 2 and Comparative Example 4 was continuously irradiated at a prescribed part thereof with a reproducing light beam having a power of 0.2 mW and a wavelength $\lambda r=830$ nm, to measure a time of 10% decay due to reproducing light within which the reflectance at the prescribed part showed a decrease by 10%. The results are shown in the following Table 3.

TABLE 3

|  | 10%-decay time |  |
|---|---|---|
| Example 2 | Example 3 | Comp. Example 4 |
| 85 sec. | 480 sec. | 4 sec. |

As is understood from the above Table 3, the optical cards of Examples 2 and 3 according to the present invention showed a remarkably slow speed of lowering in reflectance due to irradiation with the reproducing light beam in comparison with the optical card of Comparative Example 4 having a recording layer comprising a single layer of an organic coloring matter.

Comparative Example 5

An optical card was prepared in the same manner as in Example 2 except that the thickness of the light-reflecting layer was changed to 1800 Å corresponding to $\lambda r/2n^{ref}$; the thickness of the transparent intermediate layer was changed to 3000 Å corresponding to $\lambda r/2\hat{N}^{int}$; and the thickness of the light-absorbing layer was changed to 2000 Å corresponding to $\lambda r/2n^{abs}$.

Then, each of the optical cards obtained in Examples 2 and 3 and Comparative Example 5 was subjected to repetitive irradiation with a reproducing light beam while driving the card at a speed of 400 mm/sec to examine the upper limit of the reproducing light beam power causing no optically detectable change (a reflectance lowering of at most 2% after 5,000 passes of repetitive reproduction), whereby the following results were obtained.

TABLE 4

| Example 2 | Example 3 | Comp. Example 5 |
|---|---|---|
| 0.6 mW | 1.0 mW | 0.3 mW |

EXAMPLE 4

An optical disk was prepared in the same manner as in Example 1 except that the light-reflecting layer was formed as a 1300 Å-thick layer of a compound of the structural formula [V] below and the light-absorbing layer was formed as a 900 Å-thick layer of a compound of the structural formula [IV] below:

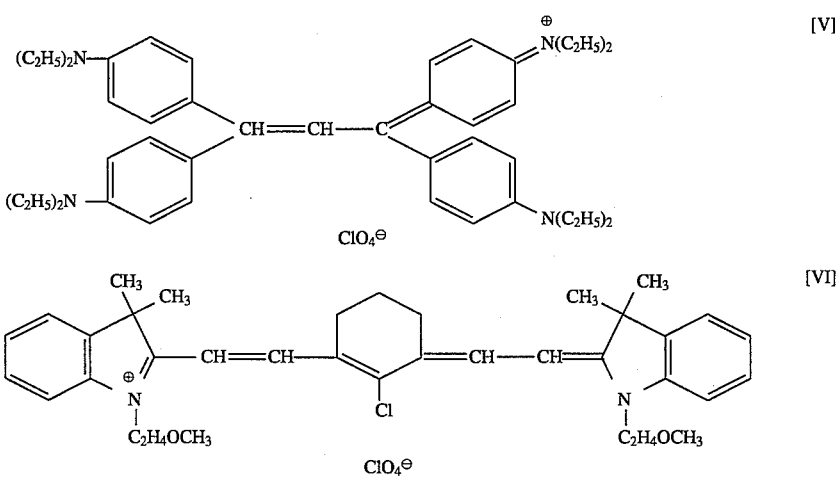

More specifically, the light-reflecting layer was formed by dripping a 5.5 wt. % solution in diacetone alcohol of the compound of the above formula [V] onto the disk substrate while rotating the disk substrate at 3000 rpm for 60 sec., followed by drying. The light-absorbing layer was formed by dripping a 5.5 wt. % solution in diacetone alcohol of the compound of the formula [VI] onto the protective substrate while rotating the protective substrate at 3000 rpm for 90 sec., followed by drying.

Incidentally, in the optical disk of this Example, the compound of the above formula [VI] was selected so as to provide a maximum absorption wavelength substantially equal to the wavelength ($\lambda w= 780$ nm) of a recording light beam.

Further, the thickness of the light-absorbing layer was determined so as to be within the range of $(\ln 2 \cdot \lambda w/2\pi \cdot k^{abs})$ to $(\lambda w/3n^{abs})$ in view of the compound of the formula [VI] showing a refractive index $N^{abs}= 3.2-0.31i$ (i.e., $n^{abs}=3.2$, $k^{abs}=0.31$).

The thickness of the light-reflecting layer was determined so as to be approx. 3 times $\lambda r/4n^{ref}$ in view of the compound of the formula [V] showing a refractive index $\hat{N}^{ref}=4.85-0.15i$ (i.e., $n^{ref}= 4.85$, $k^{ref}=0.15$).

The transmittance of the optical disk was measured by irradiation with a laser beam of 830 nm in wavelength incident from the transparent substrate side in the same manner as in Example 1.

The optical disk was subjected to information recording by using the same optical disk evaluating apparatus under the same recording conditions as in Example 1 except that a recording light beam of 780 nm in wavelength was used. After the recording, the protective substrate and the transparent substrate of the optical disk were peeled from each other and observed through an optical microscope, whereby pits comprising deformation and decoloration were observed in both the light-absorbing layer and the light-reflecting layer.

Then, another optical disk prepared and subjected to information recording in the same manner as described above was set in the above-mentioned optical disk evaluating apparatus and subjected to information reproduction by irradiating the disk with a reproducing light beam incident through the transparent substrate and having a wavelength of 830 nm, a beam diameter of 1.6 μm and a power of 0.5 mW to measure the recording contrast.

Then, the same reproducing light beam was used to irradiate a particular track of the optical disk $10^6$ times for repetitive reproduction, and the change of the reproduced signal (RF output) was measured (reproduction durability test). The results are shown in Table 5 appearing hereinafter.

reproduction for measuring the recording contrast and also to the reproduction durability test in the same manner as in Example 4.

The results of Comparative Examples 6 and 7 are also shown in Table 5 below.

TABLE 5

|  | Example 4 | Comp. Example 6 (light-reflecting layer alone) | Comp. Example 7 (light-absorbing layer alone) |
|---|---|---|---|
| Reflectance of optical disk (at 830 nm) | 36% | 27% | 30% |
| Maximum absorption wavelength of the light-reflecting layer | — | 660 nm | — |
| Maximum reflection wavelength of the light-reflecting layer (maximum reflectance of the light-reflecting layer alone) | — | 850 nm (30%) | — |
| Maximum absorption wavelength of the light-absorbing layer (maximum absorptance of the light-absorbing layer alone) | — | — | 820 nm (55%) |
| RF output change after the repetitive reproduction | 1% | 5% | >25% |
| Recording contrast | 0.65 | <0.1 | 0.68 |
| Absorptance at 780 nm used for recording | — | 16% | 60% |
| Absorptance at 830 nm used for reproduction | — | 20% | — |

Comparative Example 6

An optical disk was prepared by forming only the light-reflecting layer in Example 4 on the optical disk substrate in Example 4. By using the optical disk, the light-reflecting layer also used in Example 4 was subjected to measurement of the maximum absorption wavelength, the maximum reflection wavelength, the maximum absorptance and the maximum reflectance by using the spectrophotometer. The reflectance and the absorptance with respect to light beams having wavelengths of 780 nm and 830 nm were also measured in the same manner as in Example 4. Further, the optical disk was subjected to information recording and reproduction to measure the recording contrast and also to the reproduction durability test in the same manner as in Example 4.

Comparative Example 7

An optical disk was prepared by forming only the light-absorbing layer in Example 4 on the optical disk substrate in Example 4. By using the optical disk, the maximum absorption wavelength and the maximum absorptance of the light-absorbing layer and also the reflectance and absorptance with respect to light of 830 nm in wavelength were measured in the same manner as in Comparative Example 6. Further, the optical disk was subjected to information recording and

Reference Example 1

An optical card was prepared in the same manner as in Example 3 except that the transparent intermediate layer was formed as a 1400 Å-thick layer of a silicone resin (trade name: "SD4570", available from Shin-Etsu Silicone K.K.). The thickness of the transparent intermediate layer was determined so as to be approx. $\lambda r/4N^{int}$ in view of the silicone resin showing a refractive index $N^{int}=1.52$.

Then, the optical card was continuously irradiated at a prescribed part thereof with a reproducing light beam having a power of 0.2 mW and a wavelength $\lambda r=830$ nm to measure a 10%-decay time of 180 sec. in which the reflectance at the prescribed part showed a 10% decrease.

What is claimed is:

1. An optical recording medium for use in combination with a reproducing light beam having a prescribed wavelength $\lambda r$ and a prescribed intensity and a recording light beam having a wavelength different from the prescribed wavelength, said medium comprising in sequence:
   a transparent substrate;
   a light-reflecting layer;
   a transparent intermediate layer; and
   a light-absorbing layer,
   the light-reflecting layer and light-absorbing layer having mutually different maximum absorption wavelengths and the light-reflecting layer, transparent intermediate layer and light-absorbing layer having respectively prescribed thicknesses so as to constitute a multi-layer optical element showing a high reflectance with respect to the reproducing light beam, which is incident through the substrate, the optical recording medium being free from causing a substantial optically detectable change when irradiated with the reproducing light beam through the substrate, whereas at least one of the light reflecting layer and the light absorbing layer causes an optically detectable change when irradiated with the reproducing light when the light-reflecting layer, transparent intermediate layer and light-absorbing layer are disposed in different thicknesses, whereby the optical recording medium is capable of information reproduction at a high contrast without causing an optically detectable change by irradiation with the reproducing light beam.

2. A medium according to claim 1, wherein the light-reflecting layer and the light-absorbing layer contain organic coloring matter.

3. A medium according to claim 1, wherein the light-reflecting layer has a thickness $d^{ref}$ and a refractive index including a real part $n^{ref}$, the transparent intermediate layer has a thickness $d^{int}$ and a refractive index including a real part $n^{int}$, and the light-absorbing layer has a refractive index including a real part $n^{abs}$; the refractive indices satisfying the relationships of $n^{int} < n^{ref}$ and $n^{int} < n^{abs}$, and $d^{ref}$ and $d^{int}$ satisfying the following relationships (1) and (2):

$$(\lambda r / 6 n^{ref}) \cdot (2l+1) < d^{ref} < (\lambda r / 3 n^{ref}) \cdot (2l+1) \quad (1)$$

$$(\lambda r / 6 n^{int}) \cdot (2m+1) < d^{int} < (\lambda r / 3 n^{int}) \cdot (2m+1) \quad (2)$$

wherein l and m are respectively 0 or a positive integer.

4. A medium according to claim 1, wherein the light-reflecting layer shows a maximum reflection wavelength $\lambda(R^{ref}\text{max})$ which is substantially equal to the wavelength $\lambda r$ of the reproducing light beam.

5. A medium according to claim 1, wherein the light-absorbing layer shows a maximum absorption wavelength $\lambda^{abs}\text{max}$ which is substantially equal to a wavelength $\lambda w$ of a recording light beam, and the light-reflecting layer shows a maximum absorption wavelength $\lambda^{ref}\text{max}$ shorter than $\lambda w$.

6. A medium according to claim 1, wherein the light-reflecting layer shows an absorptance of at most 20%, the transparent intermediate layer shows an absorptance of at most 1% and the light-absorbing layer shows an absorptance of at least 50%, respectively, at a wavelength $\lambda w$ of a recording light beam.

7. A medium according to claim 1, wherein the light-reflecting layer shows a maximum reflection wavelength $\lambda(R^{ref}\text{max})$ and the light-absorbing layer shows a maximum absorption wavelength $\lambda^{abs}\text{max}$, each of the $\lambda(R^{ref}\text{max})$ and $\lambda^{abs}\text{max}$ wavelengths being substantially equal to the wavelength $\lambda r$ of the reproducing light beam which in turn is substantially equal to a wavelength $\lambda w$ of a recording light beam.

8. A medium according to claim 1, wherein said transparent intermediate layer comprises polyvinyl alcohol.

9. An optical recording method, comprising:

providing an optical recording medium comprising in sequence a transparent substrate, a light-reflecting layer, a transparent intermediate layer and a light-absorbing layer; and focusing a light beam at the light-absorbing layer through the transparent substrate to provide an optically detectable change in both the light-absorbing layer and the light-reflecting layer for recording information, wherein the light-reflecting layer and the light-absorbing layer comprise respective layers of organic compounds showing mutually different maximum absorption wavelengths, and the light beam has a frequency and an intensity sufficient to be absorbed by the light-absorbing layer to provide an optically detectable change at least at a focused part in the light-absorbing layer and a corresponding part in the light-reflecting layer without damaging the transparent substrate when focused at the light-absorbing layer.

10. A method according to claim 9, wherein the light beam has a wavelength substantially equal to the maximum absorption wavelength of the light-absorbing layer.

11. A method according to claim 9, wherein the light beam has a wavelength at which the light-reflecting layer shows an absorptance of at most 20%, the transparent intermediate layer shows an absorptance of at most 5%, and the light-absorbing layer shows an absorptance of at least 50%.

12. An optical recording method, comprising:

providing an optical recording medium comprising in sequence a transparent substrate, a first organic coloring matter layer, a transparent intermediate layer and a second organic coloring matter layer, the first and second organic coloring matter layers having mutually different maximum absorption wavelengths, each of the first organic coloring matter layer, transparent intermediate layer and second organic coloring matter layer having a prescribed thickness; and focusing a light beam at the second organic coloring matter layer through the transparent substrate to provide an optically detectable change at least at a focused portion in the second organic coloring matter layer and a corresponding portion in the first organic coloring matter layer for recording information the light beam having a frequency and an intensity sufficient to be absorbed by the second organic coloring matter layer.

13. A method according to claim 12, wherein the light beam has a wavelength substantially equal to the maximum absorption wavelength of the second organic coloring matter layer.

14. A method according to claim 13, wherein the wavelength of the light beam is substantially equal to a maximum reflection wavelength of the first organic coloring matter layer.

15. An optical reproducing method, comprising:

providing a light beam having a prescribed wavelength and a prescribed intensity;

providing an optical recording medium comprising in sequence a transparent substrate, a light-reflecting layer, a transparent intermediate layer and a light-absorbing layer, an information pit having been formed as an optically detectable change at mutually corresponding portions in the light-absorbing layer and the light reflecting layer, the light-reflecting layer and light-absorbing layer having mutually different maximum absorption wavelengths and the light-reflecting layer, transparent intermediate layer and light-absorbing layer having respectively prescribed thicknesses, so as to constitute a multi-layer optical element showing a high reflectance with respect to the light beam incident through the substrate, whereby the optical recording medium is free from causing a substantial optically detectable change when irradiated with the light beam through the substrate, whereas at least one of the light-reflecting layer and light-absorbing layer causes an optically detectable change when irradiated with the light beam when the light-reflecting layer, transparent intermediate layer and light-absorbing layer are disposed in different thicknesses; and irradiating the optical recording medium with a light beam through the substrate to reproduce a signal corresponding to the information pit.

16. A method according to claim 15, wherein the reproducing light beam has a wavelength substantially equal to a maximum reflection wavelength of the light-reflecting layer.

17. A method according to claim 15, wherein the reproducing light beam has a wavelength at which the light-reflecting layer shows an absorptance of at most 20% and the transparent intermediate layer shows an absorptance of at most 5%.

18. A method according to claim 15, wherein the light-reflecting layer and the light-absorbing layer contain organic coloring matter.

19. A method according to claim 15, wherein said transparent intermediate layer comprises polyvinyl alcohol.

20. An optical recording medium, comprising in sequence:

a transparent substrate;

a light-reflecting layer;

a transparent intermediate layer comprising polyvinyl alcohol; and a light-absorbing layer, wherein the light-reflecting layer, the transparent intermediate layer and the light-absorbing layer in combination constitute a multi-layer optical element showing a high reflectance with respect to a reproducing light beam having a wavelength $\lambda r$ and the light-absorbing layer shows a maximum absorption wavelength $\lambda^{abs}max$ which is substantially equal to a wavelength $\lambda w$ of a recording light beam, and the light-reflecting layer shows a maximum absorption wavelength $\lambda^{ref}max$ shorter than $\lambda w$.

21. A medium according to claim 20, wherein the light reflecting layer shows a maximum reflection wavelength $\lambda(R^{ref}max)$ which is substantially equal to the wavelength $\lambda r$ of the reproducing light beam.

22. A medium according to claim 20, wherein the light-reflecting layer shows an absorptance of at most 20%, the transparent intermediate layer shows an absorptance of at most 1% and the light-absorbing layer shows an absorptance of at least 50%, respectively, at a wavelength $\lambda w$ of a recording light beam.

23. A medium according to claim 20, wherein the light-reflecting layer shows a maximum reflection wavelength $\lambda(R^{ref}max)$ and the light-absorbing layer shows a maximum absorption wavelength $\lambda^{abs}max$, each of the $\lambda(R^{ref}max)$ and $\lambda^{abs}max$ wavelengths being substantially equal to the wavelength $\lambda r$ of the reproducing light beam which in turn is substantially equal to a wavelength $\lambda w$ of a recording light beam.

24. An optical recording and reproducing method, comprising:

providing a first light beam and a second light beam, each having a prescribed wavelength being different from each other and a prescribed intensity;

providing an optical recording medium comprising in sequence a transparent substrate, a light-reflecting layer, a transparent intermediate layer, a light-absorbing layer and a protective substrate, the light-reflecting layer, transparent intermediate layer and light-absorbing layer having respectively prescribed thicknesses so as to constitute a multi-layer optical element showing a high reflectance with respect to the first light beam irradiated through the substrate, whereby the optical recording medium is free from causing a substantial optically detectable change when irradiated with the first light beam through the substrate, whereas at least one of the light reflecting layer and light-absorbing layer causes an optically detectable change when irradiated with the light beam when the light-reflecting layer, transparent intermediate layer and light-absorbing layer are disposed in different thicknesses;

irradiating the optical recording medium with the second light beam through the protective substrate to cause an optically detectable change in the light absorbing layer and a corresponding portion in the light-reflecting layer, thereby recording information; and irradiating the optical recording medium with the first light beam through the substrate to reproduce the information.

25. A method according to claim 24, wherein the light-reflecting layer and light-absorbing layer contain organic coloring matter.

26. A method according to claim 24, wherein the second light beam has a wavelength at which the light-reflecting layer shows an absorptance of at most 20%, the transparent intermediate layer shows an absorptance of at most 5%, and the light-absorbing layer shows an absorption of at least 50%.

27. A method according to claim 24, wherein the second light beam has a wavelength substantially equal to the maximum absorption wavelength of the light absorbing layer.

28. A method according to claim 24, wherein the wavelength of the second light beam is substantially equal to a maximum reflection wavelength of the light-reflecting layer.

29. A method according to claim 24, wherein said transparent intermediate layer comprises polyvinyl alcohol.

* * * * *

UNITED STATES PATENT AND TRADEMARK OFFICE
CERTIFICATE OF CORRECTION

PATENT NO. : 5,479,394

DATED : December 26, 1995

INVENTOR(S) : MASATAKA YASHIMA, ET AL.

It is certified that error appears in the above-indentified patent and that said Letters Patent is hereby corrected as shown below:

COLUMN 10:

Line 55, "preferred+to" should read --preferred to--.

COLUMN 13:

Line 63, "an-annular" should read --an annular--; and

Line 64, "6.3 mm" should read --63 mm--.

UNITED STATES PATENT AND TRADEMARK OFFICE
CERTIFICATE OF CORRECTION

PATENT NO. : 5,479,394
DATED : December 26, 1995
INVENTOR(S) : Masataka Yashima et al It is certified that error appears in the above-indentified patent and that said Letters Patent is hereby corrected as shown below:

<u>COLUMN 15</u>:

Line 33, "measured-in" should read --measured in--.

<u>COLUMN 24</u>:

Line 34, "information" should read --information,--.

Signed and Sealed this

Twenty-eighth Day of May, 1996

Attest:

BRUCE LEHMAN

*Attesting Officer*      *Commissioner of Patents and Trademarks*